United States Patent
Kempf

(10) Patent No.: US 11,940,075 B2
(45) Date of Patent: Mar. 26, 2024

(54) PIPE HAVING A FLANGE

(71) Applicant: ContiTech Techno-Chemie GmbH, Karben (DE)

(72) Inventor: Dominik Kempf, Frankfurt (DE)

(73) Assignee: ContiTech Techno-Chemie GmbH, Karben (DE)

( * ) Notice: Subject to any disclaimer, the term of this patent is extended or adjusted under 35 U.S.C. 154(b) by 192 days.

(21) Appl. No.: 17/596,244

(22) PCT Filed: Apr. 22, 2020

(86) PCT No.: PCT/EP2020/061155
§ 371 (c)(1),
(2) Date: Dec. 6, 2021

(87) PCT Pub. No.: WO2020/244842
PCT Pub. Date: Dec. 10, 2020

(65) Prior Publication Data
US 2022/0316640 A1 Oct. 6, 2022

(30) Foreign Application Priority Data

Jun. 7, 2019 (DE) .................. 10 2019 208 375.7

(51) Int. Cl.
*F16L 41/00* (2006.01)
*F16L 23/00* (2006.01)
(Continued)

(52) U.S. Cl.
CPC ........... *F16L 41/008* (2013.01); *F16L 23/006* (2013.01); *F16L 23/032* (2013.01); *F16L 55/043* (2013.01); *F16L 55/053* (2013.01)

(58) Field of Classification Search
CPC ..... F16L 41/008; F16L 23/006; F16L 55/043; F16L 55/053; F16L 13/0209
See application file for complete search history.

(56) References Cited

U.S. PATENT DOCUMENTS 2,191,990 A * 2/1940 Jordan ..................... F16L 55/04
73/707
4,445,829 A * 5/1984 Miller .................... F16L 55/053
417/543

(Continued)

FOREIGN PATENT DOCUMENTS

CN 107830296 A 3/2018
CN 114458855 A * 5/2022

(Continued)

OTHER PUBLICATIONS

International Search Report dated Jul. 13, 2020 of International application PCT/EP2020/061155 on which this application is based.

(Continued)

*Primary Examiner* — Zachary T Dragicevich
*Assistant Examiner* — James A Linford
(74) *Attorney, Agent, or Firm* — Richard A. Wolf; Gregory J. Adams

(57) ABSTRACT

A pipe having a pipe element for conveying a medium in a flow direction and having a flange element for connecting the pipe element to a connection partner. The pipe element has a pipe body with a media passage opening for conveying the medium in the flow direction. The flange element has a flange body with a media passage opening for conveying the medium in the flow direction. The flange element is arranged at one end of the pipe element in such a way that the media passage openings at least substantially overlap. The pipe has a sensor element which is arranged in the flange body in such a way that at least a portion of the sensor element can be in contact with the medium.

11 Claims, 2 Drawing Sheets

Figure 1:
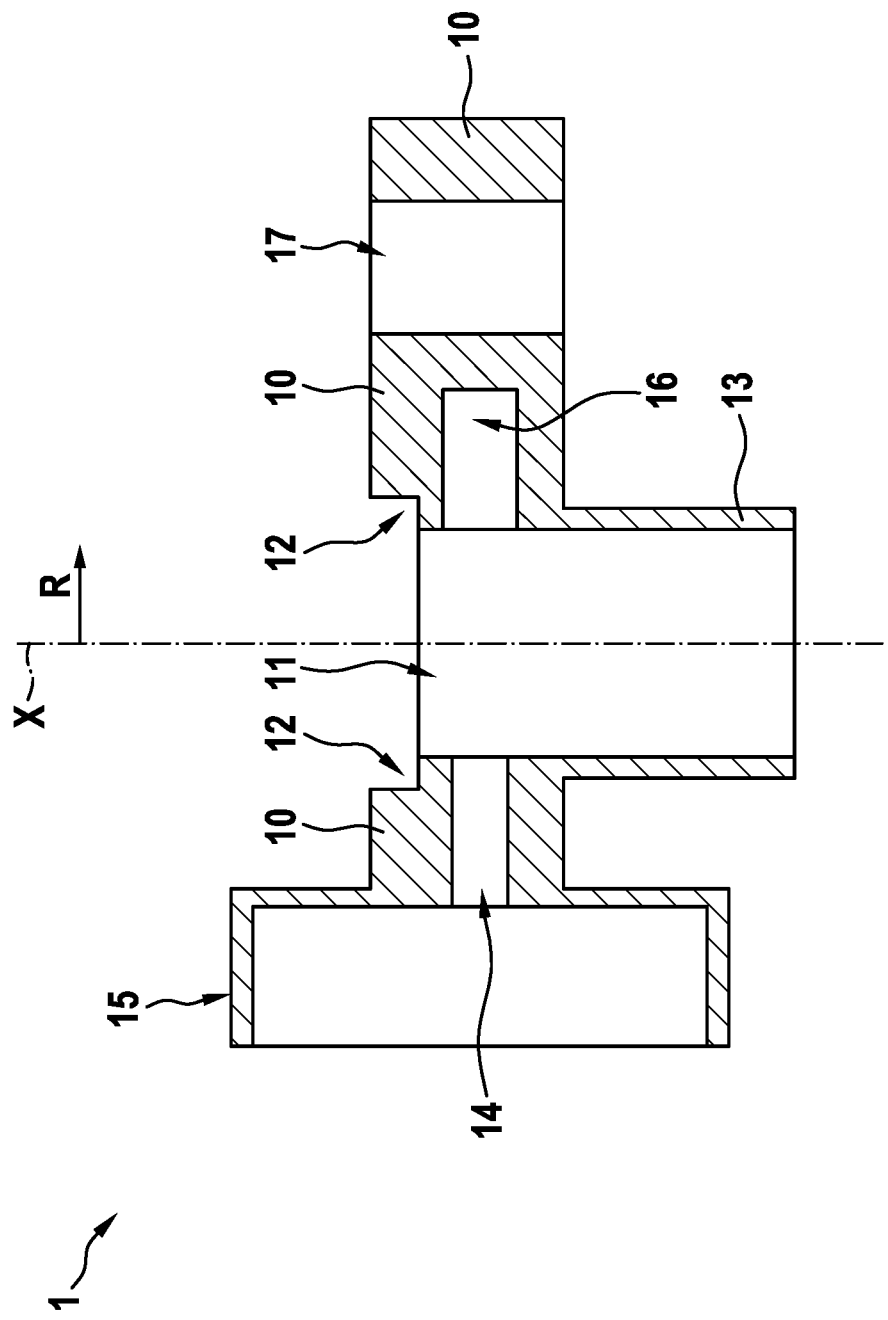

(51) Int. Cl.
    *F16L 23/032*     (2006.01)
    *F16L 55/04*     (2006.01)
    *F16L 55/053*     (2006.01)

(56) References Cited

U.S. PATENT DOCUMENTS

| | | |
|---|---|---|
| 2003/0025325 A1 | 2/2003 | Rehmann et al. |
| 2015/0240982 A1 | 8/2015 | Eisner |
| 2017/0198725 A1* | 7/2017 | Weber ....................... F15B 1/24 |
| 2018/0180456 A1 | 6/2018 | Ottosen et al. |

FOREIGN PATENT DOCUMENTS

| | | | | |
|---|---|---|---|---|
| DE | 10117731 C1 | | 1/2003 | |
| DE | 102009049244 A1 | * | 5/2010 | ............. F16D 48/02 |
| DE | 202010001785 U1 | * | 7/2011 | ............. F16L 41/008 |
| EP | 2505900 A1 | * | 10/2012 | ............. F16L 37/088 |
| WO | WO-2005030543 A1 | * | 4/2005 | ............. B60T 13/14 |
| WO | WO-2007106749 A2 | * | 9/2007 | ............. F16K 37/005 |
| WO | 2015161930 A1 | | 10/2015 | |
| WO | 2018232471 A1 | | 12/2018 | |

OTHER PUBLICATIONS

Examination Report dated Aug. 25, 2023 for the counterpart European Patent Application No. 20 720 820.8 and English translation of same.

\* cited by examiner

PIPE HAVING A FLANGE

The present invention relates to pipe having a pipe element for conveying a medium in a flow direction, and having a flange element for connecting the pipe element to a connection partner.

In many technical areas, it is necessary to connect two pipe elements or shaft elements rigidly together to form one pipe or one shaft. For this, flanges may be used as connection elements. A flange may be regarded as a collar-like portion of an end of a pipe element or shaft element which is bent through around 90° relative to the extent direction of the pipe element or shaft element and may be arranged flat against a connection partner. In other words, a flange may be regarded as an annular widening of an end of a pipe element or shaft element which serves for connection or attachment of the pipe element or shaft element to a connection partner. The connection partner may also be a pipe element or shaft element, but also an apparatus, machine part, housing or similar. Usually, bolts with or without nuts are used for connection. A pipe element with a flange or flange element may form a pipe.

Comparatively large forces or moments may be transmitted by means of a flange, for example in the case of a shaft. In the case of pipes, in particular when a seal is used between the flange of the pipe element or pipe portion and the connection partner, a media-tight connection can be created so that a medium, such as in particular a fluid, can be conveyed by means of the pipe as a pipeline. In this way, the two pipe elements or pipe portions may be connected together tightly, but are able to be separated again nondestructively, so as to form a pipe or pipeline.

In order to be able to measure the properties of a medium to be conveyed inside the pipe or pipeline, it may be necessary to position a sensor element of a sensor inside the pipe so that the sensor element can stand in direct contact with the medium to be conveyed. For this, usually the pipe wall of a pipe element of the pipe is penetrated e.g. by drilling in order to create a passage opening through which the sensor element can be introduced into the interior of the pipe element. The passage opening must then be sealed so that the medium to be conveyed cannot escape from the pipe at this point.

The disadvantage here is that to create the passage opening, usually a separate process is required, which may lead to corresponding complexity with resulting increased production costs. In particular, producing a passage opening in a finished pipe element may entail a not insignificant effort.

The disadvantage furthermore is that additional sensor equipment, which serves for operation of the sensor element and must usually be connected to the sensor element by cable, must be arranged outside the passage opening on the pipe element from the outside, while the sensor element is situated inside the pipe element. This may require the use of several electronic or mechanical components of the sensor equipment, which are usually comparatively small and may be sensitive to moisture, soiling and similar, and therefore must be attached in protected fashion to the outside of the pipe element.

The disadvantage is also however that sealing the pipe element again in the region of the passage opening, so as to be as media-tight as before the introduction of the passage opening, may be extremely difficult. In the case of high pressures of the medium to be conveyed and/or in the case of hot and/or aggressive media, this can lead to high costs. Despite this difficulty however, there may always remain uncertainty as to the tightness of the pipe element in the region of the passage opening of the sensor element, so that introducing a sensor element into a pipe portion through a passage opening as described above always creates a potential leakage point.

It is an object of the present invention to provide a pipe of the type described initially such that a sensor element can be introduced into the interior of the pipe more easily, more quickly, less expensively and/or more media-tightly than previously known. It is at least intended to provide an alternative to such known pipes.

According to the invention, the object is achieved by a pipe having a pipe element for conveying a medium in a flow direction, and having a flange element for connecting the pipe element to a connection partner; the pipe element having a pipe body with a media passage opening for conveying the medium in the flow direction; the flange element having a flange body with a media passage opening for conveying the medium in the flow direction; the flange element being arranged at one end of the pipe element in such a way that the media passage openings at least essentially overlap; and a sensor element which is arranged in the flange body such that at least a portion of the sensor element can be in contact with the medium.

The invention thus concerns a pipe having a pipe element for conveying a medium in a flow direction and having a flange element for connecting the pipe element to a connection partner, wherein the pipe element has a pipe body with a media passage opening for conveying the medium in the flow direction, wherein the flange element has a flange body with a media passage opening for conveying the medium in the flow direction, wherein the flange element is arranged at one end of the pipe element in such a way that the media passage openings at least essentially overlap.

The pipe is characterized by a sensor element which is arranged in the flange body in such a way that at least a portion of the sensor element can be in contact with the medium. In other words, according to the invention, a sensor element is not assigned to a pipe element or pipe portion as previously known, but instead to a flange element which is connected to the pipe element to form a pipe or a pipe portion. In this manner, the sensor element may be arranged on or in the flange during production, which can significantly simplify, accelerate and/or reduce the cost of installation. The flange element is then connected to the pipe element to form a pipe as previously known.

At the same time, in this way the sensor element may be arranged in the media passage opening of the flange, and thus come into contact with the medium during operation of the pipe, so that it can detect properties of the medium such as e.g. temperature, flow speed and similar. For this, the sensor element may be arranged in the media passage opening of the flange as a self-contained element, e.g. including an electrical energy accumulator and/or an energy-generating element, e.g. by means of energy harvesting for example from the flow, temperature, a temperature difference and similar of the medium or environment, and inclusive of a transmitter element, a receiver element or a transmitter/receiver element, in order to be able to carry out the sensory detection without the need for electrical or other cable connections for transmission of electrical energy and/or data to or from the environment of the flange. Rather, the sensor element may be operated by means of stored and/or self-generated electrical energy. Operation of the sensor element may be partially to completely automatic and/or be controlled externally by wireless communication. The detected data may be transmitted wirelessly to the outside by the sensor element. In this way, there is no need for sensor passage openings in the flange for conducting cables for transmission of electrical energy and/or data or instructions in the one and/or other direction, so no passage opening need be sealed or can constitute a potential leakage point. This may in particular improve or ensure the tightness.

Nonetheless, a sensor passage opening may also be provided in the flange, as will be described in more detail below, since this also offers advantages and can partially or completely achieve the above-mentioned properties and advantages.

According to an aspect of the invention, the sensor element is arranged in the flange body such that at least a portion of the sensor element extends into the passage opening of the flange element. This may in some cases improve the sensory detection of properties of the medium during operation, since the contact area between the sensor element and the medium can be enlarged. Also, for certain properties such as e.g. flow speed, it may be advantageous or even necessary for the medium to flow over at least a portion of the sensor element. This may be achieved or promoted by protrusion of the sensor element into the media passage opening through which medium flows in the flow direction during operation.

According to a further aspect of the invention, the flange element has a sensor passage opening which connects the media passage opening of the flange element to the environment of the flange element, wherein at least a portion of the sensor element is arranged in the sensor passage opening. As mentioned above as a variant, according to this aspect of the invention, a sensor passage opening is provided through the material of the flange and connects the media passage opening of the flange to the environment of the flange. During production, the sensor element may be inserted in the sensor passage opening such that, as described above, the sensor element can sensorily detect properties of the medium during operation. The electrical energy necessary for this may in this case be supplied in particular via a cable through the sensor passage opening. Also, instructions may be transmitted to the sensor element through the sensor passage opening, in particular via a corresponding data cable, and collected data representing measurement values may be transmitted from the sensor element to the outside of the flange. The use of a wireless or cable-less energy and/or data transmission may be beneficial here, since the material of the flange need not be penetrated. Also, a wire-conducted or cable-conducted energy and/or data transmission can thus be achieved which, depending on application, may be more economic, more robust and/or more durable.

In particular, the sensor element may be attached in the sensor passage opening by gluing or screwing. Thus at the same time, a partial to complete seal may be achieved by the adhesive or thread. The sensor element may also be inserted in the sensor passage opening from the radial outside, and be secured against slipping out from the outside, e.g. by at least one additional securing element such as for example a locking ring or similar, or by at least one further element of a sensor of the sensor element, which may itself be retained. In this case, correspondingly close dimensions of the sensor passage opening relative to the sensor element may achieve a certain tightness. In any case, the additional use of a sealing element may be advantageous, which may be arranged between the sensor element and the sensor passage opening and have a media-tight action.

According to a further aspect of the invention, the sensor passage opening extends at least substantially perpendicularly to the flow direction of the medium. This may simplify the production of the sensor passage opening e.g. by drilling. Also, this may promote the arrangement of a sensor element oriented perpendicularly to the flow direction of the medium. Furthermore, the space required for the sensor passage opening in the material of the flange body, in the flow direction of the medium, may thereby be kept as small as possible so that the flange element can be held as flat as possible in the flow direction of the medium. This may allow the use of the sensor element as described without the need to substantially change the design of previously used flange elements.

According to a further aspect of the invention, the sensor passage opening is configured as a bore in the flange body. This may simplify production of the flange element as described above.

According to a further aspect of the invention, the flange element has a pulsation damping chamber which is configured as a recess inside the flange body open towards the media passage opening. This may also create the possibility of pulsation damping of the medium by means of the flange element, so that pulsations in the medium can be damped without further measures. In particular, this function may additionally be exerted by the flange element so that there is no need for additional pulsation damping elements, which constitute additional cost and in particular could increase the risk of additional potential leakage points.

According to a further aspect of the invention, the pulsation damping chamber comprises a Helmholtz resonator or damping membrane. The corresponding properties and advantages may thus be achieved with the flange element or the pipe.

According to a further aspect of the invention, the pulsation damping chamber is arranged directly opposite the sensor passage opening. In this way, the pulsation damping chamber may be introduced into the material of the flange body from the radial inside, through the radially opposite sensor passage opening, so that this need not take place on the side of the pulsation damping chamber, e.g. from the radial outside. In this case, the pulsation damping chamber would have to be closed again on the radial outside, which may entail an additional cost which can be avoided by introduction from the radial inside towards the outside. This could also lead to a further potential leakage point.

According to a further aspect of the invention, the pulsation damping chamber is configured as a bore in the flange body through the sensor passage opening. In this way, the aspect of the invention described above may be implemented particularly easily in that the bore need only be made sufficiently wide to allow formation of both the sensor passage opening and also the pulsation damping chamber in one working step.

According to a further aspect of the invention, the flange element has a sensor receiver which at least substantially receives a sensor housing. In other words, a sensor housing, which may form a sensor together with the sensor element and in some cases further elements such as analysis electronics, data transmission, an electrical energy accumulator and similar, and receive these elements in a protected fashion, may also be received and held by the flange element. In this way, a complete sensor including sensor element may be arranged on the flange element during production and be arranged on the pipe element together with the flange element in a subsequent mounting step. This can simplify, accelerate and/or reduce the costs of production accordingly.

According to a further aspect of the invention, the sensor receiver is formed integrally with the flange body. This may improve retention of the sensor receiver and sensor received therein together with the flange element. This may also simplify production.

According to a further aspect of the invention, the volumes which are at least partially encased by the sensor receiver and sensor passage opening are connected together. This may allow or promote direct insertion of the sensor element through the sensor passage opening on introduction of the sensor and sensor receiver of the flange body, so this may take place in one working step.

According to a further aspect of the invention, at least a portion of the sensor receiver is arranged directly radially outside the sensor passage opening. This may favor the above-described aspect of the invention.

According to a further aspect of the invention, the pipe element and the flange element are produced separately and then connected together to form the pipe. This can simplify the production. The connection between the one end of the pipe element and the flange element may preferably be produced by substance bonding in order to create a media-tight connection at this point which is as stably durable as possible. Depending on application, this may take place e.g. by bonding or welding, in particular by laser welding or plasma welding. The pipe element and the flange element may in this way be joined together into a one-piece assembly in the form of a pipe.

The invention also concerns a flange element for use with a pipe as described above, wherein the flange element has a flange body with a media passage opening for conveying a medium in a flow direction, wherein the flange element is configured to be arranged at one end of a pipe element such that the media passage opening of the flange element at least substantially overlaps with a media passage opening of a pipe body of the pipe element for conveying the medium in the flow direction, wherein the flange body is configured to receive a sensor element such that at least a portion of the sensor element can be in contact with the medium. In this way, a flange element can be created so that a pipe according to the invention as described above can be produced.

In other words, a modern (aluminum) flange may retain its original thickness, but has an additional outlet on the side. The complete contour (flange and outlet) is made of one piece and thus does not contain any (additional) potential leakage point. The actual measurement cell may be inserted from the side and, if contained in its own housing, may be encapsulated or press-fitted. Furthermore, because of the type of necessary lateral machining, a fluid pulsation damping chamber may be introduced in the flange "cost-neutrally", either "open" or with an additionally inserted Helmholtz resonator, damping membrane or similar. In this way a low-cost pipe may be created as described above, since production can take place with fewer process steps than previously known. Also, the number of sealing points may be reduced.

Figure 2:
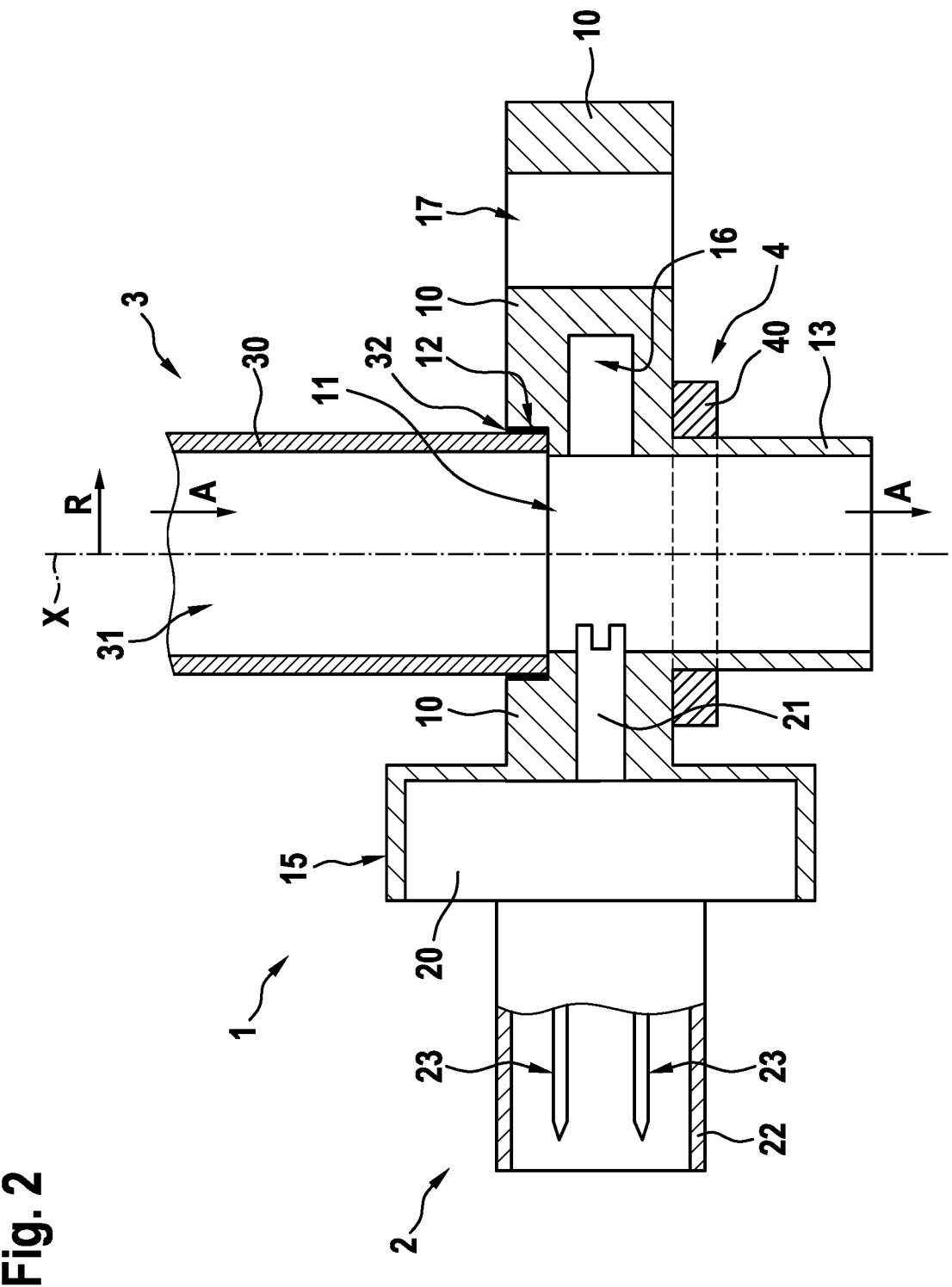

An exemplary embodiment and further advantages of the invention will be discussed below in conjunction with the following figures, In the drawings:

FIG. 1 shows a schematic, longitudinal section through a flange element according to the invention; and FIG. 2 shows a schematic, longitudinal section through a pipe according to the invention.

The description of the above-mentioned figures is given with reference to cylindrical coordinates with a longitudinal axis X, a radial direction R oriented perpendicularly to the longitudinal axis X, and a circumferential direction (not shown) running around the longitudinal axis X.

FIG. 1 shows a schematic longitudinal section through a flange element 1 according to the invention. The flange element 1 consists of a flange body 10 made of aluminum, which is produced integrally e.g. as a casting or milled part. Along the longitudinal axis X, the flange body 10 has a media passage opening 11 through which a medium, e.g. a fluid, can flow in a flow direction A (or in the opposite direction), as will be explained in more detail with reference to FIG. 2. In the illustration of FIG. 1, a pipe receiver 12 is provided which can receive a pipe element 3, as will also be explained in more detail with reference to FIG. 2. The pipe receiver 12 is here configured as a recess or depression.

On the opposite side along the longitudinal axis X, the pipe receiver 12 has a guide element 13 which points away from the flange body 10 as an annular protrusion and is configured to be introduced into a corresponding opening of a connection partner such as e.g. an apparatus (not shown). A sealing ring body 40, which is closed in the circumferential direction, of a sealing element 4 may be arranged round the guide element 13, see FIG. 2.

A lateral sensor passage opening 14 extends perpendicularly or radially to the longitudinal axis X, and is shown pointing to the left in FIGS. 1 and 2. The sensor passage opening 14 is introduced into the flange body 10 as a bore laterally towards the radial inside, and thus connects the media passage opening 11 radially to the environment of the flange element 1. On the radial outside, a lateral sensor receiver 15 adjoins the sensor passage opening 14; this receiver is formed significantly larger than the sensor passage opening 14 in the circumferential direction (not shown) and along the longitudinal axis X, so that a sensor 2 or its sensor housing 20 can be received therein. A sensor element 21 of the sensor 2 may in this way extend through the sensor passage opening 14 into the media passage opening 11, as will be described in more detail below with reference to FIG. 2.

During drilling, a further bore is made through the sensor passage opening 14 into the material of the flange body 10 on the radially opposite side of the media passage opening 11, forming a pulsation damping chamber 16. The pulsation damping chamber 16 may be formed open as shown in FIGS. 1 and 2, or be provided with a Helmholtz resonator or a damping membrane (not shown). In this way, pulsations in the medium flowing through the media passage opening 11 can be damped.

The flange body 10 furthermore has a connection passage opening 17 which runs parallel to the media passage opening 11. A connecting element, e.g. a bolt, can be guided through the connection passage opening 17 in order to attach the flange element 1 and its connected pipe element 3 to a connection partner (not shown) such as e.g. an apparatus.

FIG. 2 shows a schematic longitudinal section through a pipe 1, 3 according to the invention. The pipe 1, 3 comprises the above-mentioned pipe element 3 which is made of an integral, cylindrical pipe body 30 of aluminum extending along the longitudinal axis X. The pipe body 30 may also be described as a pipe wall 30. The hollow interior of the pipe body 30 forms its media passage opening 31, which has the same cross-section as the media passage opening 11 of the flange body 10. The pipe element 3 may comprise further elements such as e.g. retention and connection elements (not shown) and similar.

The pipe body 30 is inserted with an open end in the pipe receiver 12 of the flange body 10 during installation. The pipe body 30 and the flange body 10 are there welded together e.g. by laser welding, so as to form a substancebonded connection 32 in the form of a weld connection 32. This forms a one-piece pipe 1, 3.

Then the above-mentioned sensor 2 is inserted from the radial outside into the lateral sensor receiver 15 of the flange element 1, so that the sensor housing 20 in the lateral sensor receiver 15 lies thereon both radially and in the circumferential direction and along the longitudinal axis X. The sensor 2 may be fixed there, e.g. by gluing. At the same time, the sensor element 21, which may also be described as a measurement probe 21, protrudes radially inwardly into the media passage opening 11 of the flange body 10, so that the medium can flow around the measurement probe 21 or its measurement tip (not designated). This may allow the measurement probe 21 to detect properties of the medium, e.g. its temperature, flow speed and similar. The measurement probe 21 is here glued in the sensor passage opening 14 so as to achieve a secure retention and media-tight seal.

Towards the radial outside, the sensor 2 has a pair of plug contacts 23 which serve for connection of a corresponding plug connector, e.g. for electrical energy supply to or data exchange with the sensor 2. The plug contacts 23 are surrounded by a plug collar 22 for protection.

In this way, a pipe 1, 3 can be produced which may be connected to a connection partner by means of a flange 1 as previously known. This may take place as described above, e.g. by means of a bolt through the connection passage opening 17. At the same time, a seal can be made against the connection partner, such as e.g. an apparatus, by means of the above-mentioned sealing element 4. Furthermore, the measurement probe 21 may be arranged such that the measurement probe 21 or its measurement tip can reach the medium and sensorily detect at least one property of the medium. This may take place media-tightly. At the same time, this can be achieved comparatively easily since only the flange element 1 need be machined for this, instead of the pipe element 3. This can not only keep the production costs down but also avoid potential leakage points.

LIST OF REFERENCE SIGNS (PART OF THE DESCRIPTION)

A Medium flow direction
R Radial direction
X Longitudinal axis
1 Flange element
10 Flange body
11 Media passage opening
12 Pipe receiver
13 Guide element
14 (Lateral) sensor passage opening
15 (Lateral) sensor receiver
16 Pulsation damping chamber
17 Connection passage opening
2 Sensor
20 Sensor housing
21 Sensor element, measurement probe
22 Plug collar
23 Plug contacts
3 Pipe element
30 Pipe body; pipe wall
31 Media passage opening
32 Connection; weld connection
4 Sealing element
40 Sealing element body

The invention claimed is:

1. A pipe comprising a pipe element for conveying a medium in a flow direction, and having a flange element for connecting the pipe element to a connection partner;
   wherein the pipe element comprises a pipe body with a media passage opening for conveying the medium in the flow direction;
   wherein the flange element comprises a flange body with a media passage opening for conveying the medium in the flow direction;
   wherein the flange element is arranged at one end of the pipe element in such a way that the media passage openings at least essentially overlap;
   wherein the media passage opening of the pipe element and the media passage opening of the flange body together form at least part of a main fluid passageway of the pipe that is configured to convey the medium through the pipe in the flow direction;
   wherein a sensor element is arranged in the flange body such that at least a portion of the sensor element protrudes into the main fluid passageway so as to be in contact with the medium traveling in the flow direction through the main fluid passageway;
   wherein the flange element comprises a pulsation damping chamber which is configured as a recess inside the flange body and which opens towards the main fluid passageway; and,
   wherein the pulsation damping chamber is arranged directly opposite the portion of the sensor element protruding into the main fluid passageway of the pipe.

2. The pipe as claimed in claim 1, wherein the portion of the sensor element protruding into the main fluid passageway is configured as an end of a probe of the sensor element, and wherein the flange element has a sensor opening within which the probe of the sensor element is arranged.

3. The pipe as claimed in claim 2, wherein the probe of the sensor element is elongated to extend at least substantially perpendicularly to a longitudinal axis of the main fluid passageway.

4. The pipe as claimed in claim 2, wherein the sensor opening having the probe is formed as a through-bore in the flange body.

5. The pipe as claimed in claim 2, wherein the flange element has a sensor receiver which at least substantially receives a sensor housing.

6. The pipe as claimed in claim 5, wherein the sensor receiver is formed integrally with the flange body.

7. The pipe as claimed in claim 5, wherein the volumes encased at least in portions by the sensor receiver and the sensor opening are connected together.

8. The pipe as claimed in claim 5, wherein at least a portion of the sensor receiver is arranged directly radially outside the sensor passage opening.

9. The pipe as claimed in claim 1, wherein the pipe element and the flange element (1) are produced separately and then connected together to form the pipe.

10. The pipe of claim 1, wherein the flange body has an end face having a recess configured to receive an end of the pipe body, and the main fluid passageway extends linearly along a longitudinal axis through the pipe body and the flange body, and the sensor element is configured as an elongated probe that extends perpendicularly to the longitudinal axis.

11. The pipe of claim 10, wherein the flange body includes a sensor housing that supports an electrical connector for electrically connecting the sensor element, and wherein the flange body includes a fastener connector configured to receive a fastener, the fastener connector being on an opposite side of the flange body from the sensor housing.

* * * * *